United States Patent [19]

Berger et al.

[11] E Re. 31,248

[45] Reissued May 24, 1983

[54] ELECTRO-MECHANICAL TRANSDUCER

[75] Inventors: Paul J. Berger, 200 Northern Lights Blvd., Kalispell, Mont. 59901; Ronald F. Shane, Kalispell, Mont.

[73] Assignee: Paul J. Berger, Kalispell, Mont.

[21] Appl. No.: 345,755

[22] Filed: Feb. 4, 1982

Related U.S. Patent Documents

Reissue of:

[64] Patent No.: 4,214,485
Issued: Jul. 29, 1980
Appl. No.: 913,517
Filed: Jun. 7, 1978

[51] Int. Cl.[3] ..... G01H 3/12

[52] U.S. Cl. ..... 73/655

[58] Field of Search ..... 73/655, 516 LM; 250/573, 574, 577; 340/541, 552, 555, 565, 566, 567, 689, 690

[56] References Cited

U.S. PATENT DOCUMENTS

| | | | |
|---|---|---|---|
| 1,082,014 | 12/1913 | Digby et al. | 73/655 |
| 2,324,304 | 7/1943 | Katzman | 250/573 |
| 3,107,529 | 10/1963 | Johnston | 250/573 |
| 3,302,746 | 2/1967 | Ikrath | 340/566 |
| 3,464,276 | 9/1969 | Leibert | 73/516 LM |
| 3,683,347 | 8/1972 | Melone | 340/515 |
| 3,908,129 | 9/1975 | Akers | 250/577 |
| 3,918,817 | 11/1975 | Posgate | 356/442 |
| 4,058,737 | 11/1977 | Takahashi et al. | 250/573 |
| 4,083,255 | 4/1978 | McKechnie | 73/655 |
| 4,124,841 | 11/1978 | Kettunen | 340/566 |

FOREIGN PATENT DOCUMENTS

| | | |
|---|---|---|
| 336609 | 10/1930 | United Kingdom . |
| 411775 | 6/1934 | United Kingdom . |
| 612597 | 11/1948 | United Kingdom . |
| 680899 | 10/1952 | United Kingdom . |
| 688834 | 3/1953 | United Kingdom . |
| 1425812 | 2/1976 | United Kingdom . |

*Primary Examiner*—Stephen A. Kreitman
*Attorney, Agent, or Firm*—Cushman, Darby & Cushman

[57] ABSTRACT

An electro-mechanical transducer is disclosed for measuring physical parameters such as vibration, acceleration or the angular orientation of an object to which it is attached. A closed container partially filled with a fluid, has a light source and light detector mounted in optical communication with the container's interior. The arrangement of the detector and light source is such that light from the source must pass at least once through the surface (i.e., air-fluid interface) of the fluid before being detected. A constant incident light intensity is provided within the chamber and the resultant transmitted light is measured by the detector and an associated meter circuit. As the container is vibrated, or the angular relationship of the surface of the liquid with respect to the detected light rays is varied, the light transmissive and refractive properties of the liquid surface are altered, thereby altering the output of the light detector.

91 Claims, 13 Drawing Figures

Fig. 1.
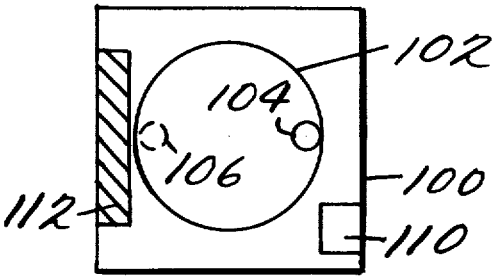
Fig. 2.
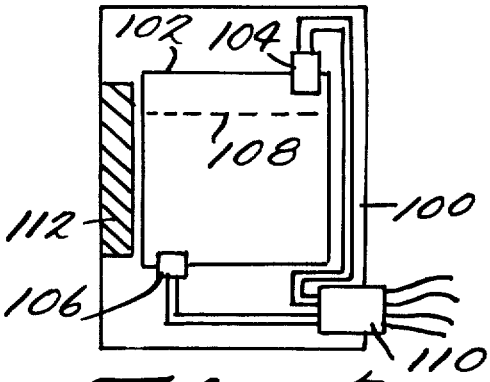
Fig. 9.
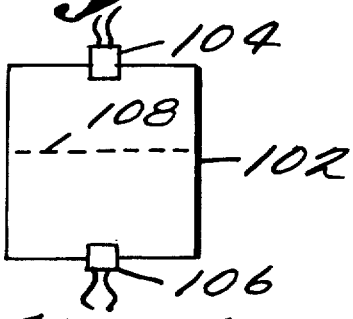
Fig. 3.
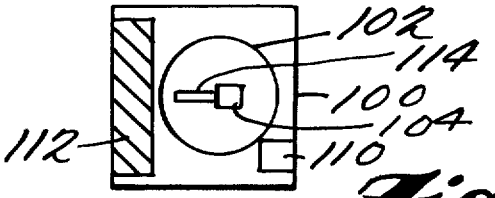
Fig. 5.
Fig. 4.
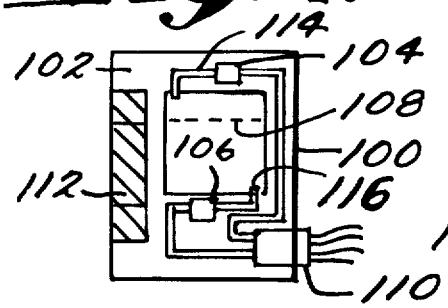
Fig. 10.
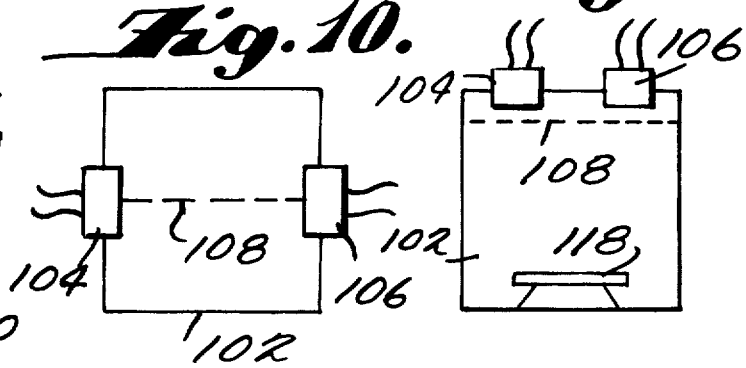
Fig. 6.
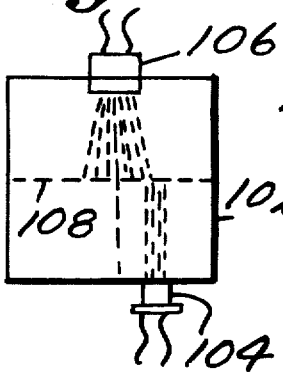
Fig. 11.
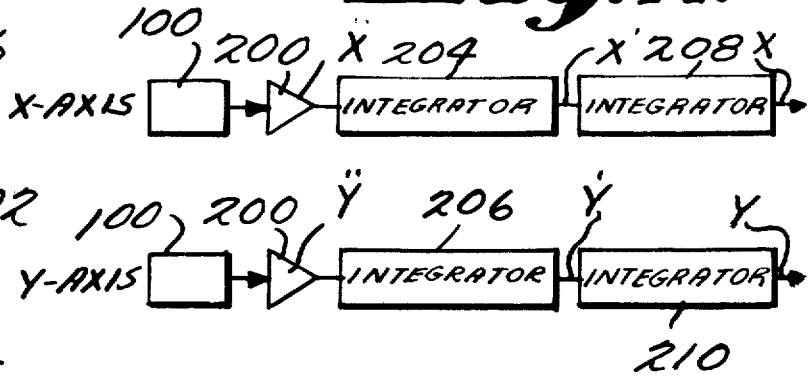

ELECTRO-MECHANICAL TRANSDUCER

Matter enclosed in heavy brackets [ ] appears in the original patent but forms no part of this reissue specification; matter printed in italics indicates the additions made by reissue.

The present invention relates to apparatus and method for detecting physical motions such as vibration, acceleration and angular orientation. More specifically, the present invention relates to such method and apparatus which utilizes changes in the refractive and transmissive properties of a fluid surface physically associated with such physical motions.

In the past, various devices have been known for the determination of vibration or acceleration; however, they are generally complicated, requiring springs or weights. Previous devices have also utilized a light source and detector to detect changes in the properties of a liquid. For example, U.S. Pat. Nos. 3,908,129 to Akers and 3,683,347 to Melone both disclose sensing devices that detect the level of a liquid. U.S. Pat. No. 3,918,817 to Posgate discloses a turbidimeter wherein liquid to be tested is placed in a tube between a light source and a detector so that the output of the detector is a measure of the turbidity of the liquid.

In the present invention, a closed container, partially filled with a liquid (the remaining volume is filled with air or inert gases, at ambient air pressure), houses a light source and a light detector arranged so that light from the source must pass at least once through the surface (i.e., air-liquid interface) of the liquid before being detected. A constant incident light intensity is provided within the chamber and the resultant transmitted light is measured by the light detector and an associated meter circuit. As the container is vibrated, or as the angular relationship of the surface of the fluid and the detected light rays vary, alterations occur in the light transmissive and refractive properties of the liquid surface to which the light detector is responsive.

The invention has a number of useful potential applications. For example, as a vibration detector, one or more devices may be used to detect vibrations in the various mechanical components of a vehicle. In this application, one device, according to the present invention, is placed on the right front shock mount and another on the left front shock mount of a vehicle. The output of the two devices are compared to detect excessive vibration. This arrangement may be utilized to determine dynamic balance of the associated tires. In a similar manner, the device or devices may be moved to check one or both ends of drive lines, rear tires, differentials, transmissions and other mechanical components. In another application, the device may be placed on machinery to periodically monitor vibration levels in order to predict failure of mechanical parts. In addition the device may be placed on the skin of an aircraft in order to monitor metal fatigue as a function of vibration. The vibration detector also has applications in seismology. The sensor could be mounted on a plate and/or pole in order to detect movements or vibration within the earth. Intrusion detection is another application of the device. When mounted on a floor, the device will detect even the slightest vibration caused by footsteps.

As an accelerometer this invention also has a number of potential applications such as, for example, the measurement of vehicle acceleration. In addition, it is useful as the accelerometer portion of an inertial navigation position indicator.

Finally, the device may be used as a level indicator. As an accelerometer or level indicator, the angle of the liquid with respect to the rays of light detected by the detector is altered as the device is accelerated or as the object to which the device is mounted changes pitch. The variation of the angular relationship causes a modification in the refraction angle of light from the source through the surface of the liquid thereby altering the light detected by the detector.

These and other objects and advantages of the invention will become more apparent and more readily appreciated from the following detailed description of the presently preferred exemplary embodiments of the invention taken into conjunction with accompanying drawings, of which:

FIG. 1 is the top plan sectional view of one vibration detector embodiment of the detector unit;

FIG. 2 is a side elevation section view of the same embodiment of the detector as in FIG. 1;

FIG. 3 is a top plan schematic view of the liquid cell arrangement of a different vibration detector embodiment;

FIG. 4 is the side elevation schematic view of the embodiment in FIG. 3;

FIG. 5 is the side elevation schematic view of the liquid cell of another vibration detector embodiment;

FIG. 6 is a side elevation schematic view of the fluid cell in still another vibration detector embodiment of the present invention;

FIG. 9 is a side elevation schematic view of a level detector embodiment of the present invention;

FIG. 10 is a side elevational view of an accelerometer embodiment of the present invention;

FIG. 11 is a schematic illustration of the inertial navigation position locater embodiment of the present invention;

Figure 7:
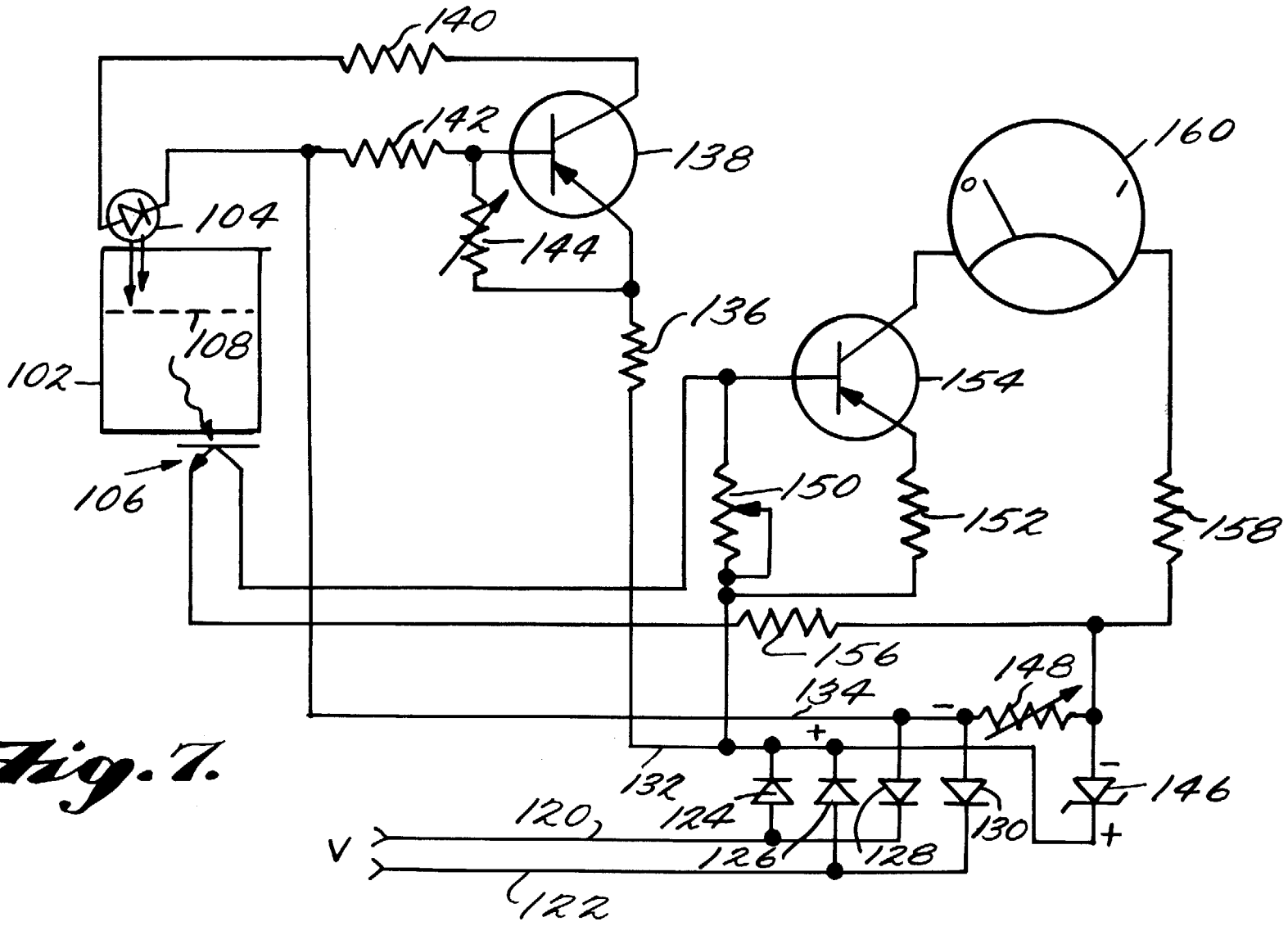
FIG. 7 is a circuit diagram of the present invention with a light emitting diode light source.

FIGS. 1 and 2 illustrate the sensor portion of one embodiment of the present invention useful in the detection of vibrations. Within housing 100 is mounted liquid cell 102, which may be made of any material, but in the preferred embodiment is plastic. Preferably, liquid cell 102 is cylindrical but other shapes (e.g., spherical or rectangular) may be used. Liquid cell 102 is partially filled with a liquid having a surface (i.e., air-liquid interface) 108. The liquid may be any liquid with sufficient transparent properties in the quiescent state, such as water, alcohol or oil. If the cell is to be utilized in temperatures below the freezing point of water, alcohol or oil are particularly advantageous. Mounted on fluid cell 102 are a radiation (e.g., light, IR, etc.) source 104 and a corresponding radiation detector 106 which respectively produce and detect radiation within liquid cell 102.

Source 104 and detector 106 can be positioned virtually anywhere on liquid cell 102, but in one preferred embodiment, source 104 and detector 106 are mounted on opposite ends of a cylindrical liquid cell 102 at diametrically opposed positions on the respective ends. In this configuration, the radiation detected by detector 106 is thought to represent an average value of the radiation that penetrates the entire liquid surface 108. As the line between detector 106 and source 104 becomes more perpendicular to liquid surface 108, the radiation that is detected becomes more nearly equal to the radiation that penetrates surface 108 directly along that line. In this vibration detector embodiment of the present invention, the detection of the average amount of radiation penetrating liquid level 108 is more desirable than the detection of radiation penetrating any particular point.

In the preferred embodiment, the outer walls of liquid cell 102 are opaque to the frequency spectrum of radiation detected by detector 106, so that detector 106 detects radiation emanating only from source 104. Source 104 may be any appropriate source of electromagnetic radiation (e.g., an incandescent lamp, a light emitting diode, or an infrared source). Detector 106 may be any device capable of detecting radiation produced by source 104 (e.g., photocell), but in the preferred embodiment is a phototransistor. It has been found that the use of a phototransistor produces more sensitive results than the use of a photoelectric or photoresistive cell. The electrical connections to source 104 and detector 106 are preferably made via a plug 110 mounted in housing 100. A corresponding plug with wire to the detection circuit and power supply for source 104 is connected to plug 110 during operation.

Magnet 112 attached to housing 100 provides a simple means for attaching the detector to a metallic object whose vibrations are to be monitored.

FIGS. 3 and 4 illustrate an alterative embodiment using fiber optics. Liquid cell 102 is mounted in housing 100 as previously described. Fiber optic 114 directs the radiation emitted by source 104 into liquid cell 102. Fiber optic 116 transmits incident radiation from liquid cell 102 to detector 106.

Alternatively, fiber optics could be used to direct light both from source 104 to several points on the surface of cell 102, and from several points on the opposite surface of cell 102 to detector 106. This arrangement is useful in obtaining a detector output related to the average amount of radiation penetrating surface 108, and in reducing the effects of motion on cell 102 as opposed to vibration.

When used as a vibration detector, the sensors illustrated in FIGS. 1–4 are attached to the object whose vibrations are to be monitored. As the level of vibration increases, liquid surface 108 becomes more turbulent and locally non-planar. The increased turbulence causes less light to be transmitted/refracted through liquid surface 104 so that the output of detector 106 decreases. The effective aperture of the source and detector preferably extends over substantially all of the liquid surface in this embodiment.

FIG. 5 illustrates another embodiment of liquid cell 102 useful for vibration detection. Source 104 and detector 106 are mounted on the same side of liquid surface 108. Mirror 118 is mounted on the opposite side of liquid surface 108. The aperture angle of source 104 and the detection angle of detector 106 are limited so that a significant portion of the radiation detected by detector 106 has passed through liquid surface 108 a first time, has been reflected by mirror 118, and has passed through liquid surface 108 a second time. This embodiment is more sensitive than the embodiments described above since the radiation emitted from source 104 is affected by surface 108 twice prior to detection by detector 106. As surface 108 becomes more uneven, less light is transmitted through surface 108 in either direction.

In all of the above embodiments, the output of detector 106 is a maximum when liquid surface 108 is quiescent. It is thought that in these embodiments detector 106 detects the average amount of light penetrating surface 108. Therefore, source 104 and detector 106 can advantageously have relatively broad aperture and detection angles respectively.

A more sensitive embodiment of the present invention, useful in detecting small vibrations, employs an opposite theory of operation wherein the disturbance of surface 108 increases the output of detector 106. Required for this embodiment are a source 104 and a detector 106 with very narrow aperture and detection angles. The preferred embodiment utilizes the MT-2 and ME-7124 as detector 106 and source 104 respectively, both manufactured by Monsanto.

As illustrated in FIG. 6, the axis of source 104 is offset from the axis of detector 106 so that the area of surface 108 illuminated by source 104 is at least mostly out of the area of surface 108 detected by detector 106. In the preferred embodiment, illustrated in FIG. 6, with the above-mentioned components, and with source 104 and detector 106 separated longitudinally by one inch, the axis of source 104 is offset from the axis of detector 106 by 0.116 inches.

In operation, the output of detector 106 is relatively small when surface 108 is quiescent, as a result of the misalignment. As container 102 is vibrated, surface 108 becomes more uneven, thereby refracting more of the light of source 104 into detector 106. Thus the output of detector 106 increases. When mounted on a concrete floor, this embodiment is capable of detecting vibrations caused by a sharp foot stamp twenty feet away.

Figure 12:
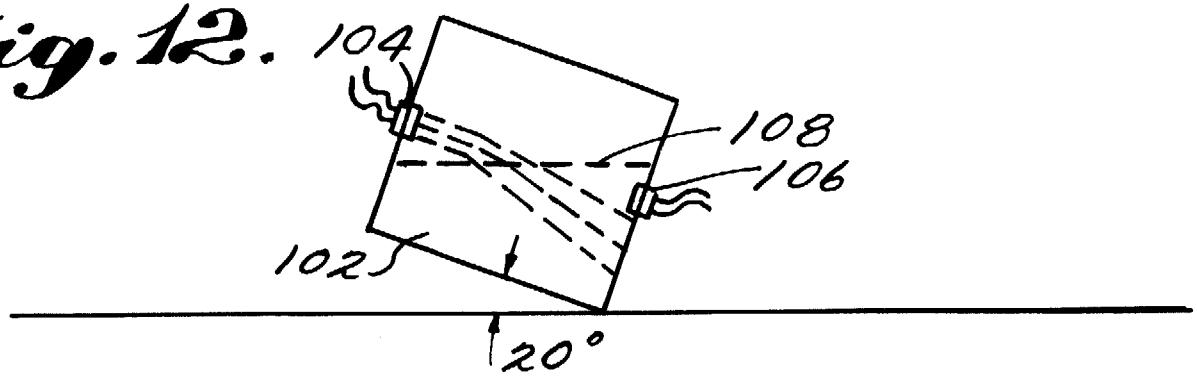
FIG. 12 is a side elevational schematic view of the fluid cell in yet another vibration detector embodiment of the present invention.

The most sensitive embodiment of the present invention, illustrated in FIG. 12, useful in detecting minute vibrations, employs a theory of operation similar to that of the embodiment in FIG. 6. Container 102 is positioned so that source 104 produces a beam of light having a relatively small incidence angle with surface 108.

In operation, the output of detector 106 is relatively small when surface 108 is quiescent, since surface 108 refracts the beam of light away from detector 106. As container 102 is vibrated, surface 108 becomes more uneven, thereby refracting more of the light of source 104 into detector 106, increasing the output of detector 106. As the angle of incidence of light from source 104 with surface 108 increases, this amplifying effect decreases. In the preferred embodiment, the angle of incidence is 20°, but may be as large as 45°.

FIG. 7 illustrates one embodiment of the circuitry of the present invention wherein source 104 is a light emitting diode and detector 106 is a phototransistor. A voltage is applied across lines 120 and 122. Diodes 124, 126, 128 and 130 are arranged as illustrated so that the voltage on line 132 is positive with respect to the voltage on line 134, independent of the polarity of the input voltage on lines 120 and 122. The positive voltage on line 132 is applied through resistor 136 to the emitter of transistor 138 which acts as a constant current source for light emitting diode source 104. The negative voltage on line 134 is supplied to the cathode of light emitting diode 104, the anode of which is connected through resistor 140 to the collector of transistor 138. The negative voltage on line 134 is also applied through resistor 142 to the base of transistor 138. The base of transistor 138 is connected through variable resistor 144 to the emitter of transistor 138.

The positive voltage on line 132 is applied to the cathode of zener diode 146, the anode of which is connected through variable resistor 148 to the negative voltage on line 134, so that zener diode 146 acts as a voltage regulator. The positive regulated voltage is applied through variable resistor 150 and resistor 152 to the base and emitter respectively of current amplifying transistor 154. The base of transistor 154 is also connected to the collector of phototransistor 106, while the emitter of phototransistor 106 is connected through resistor 156 to the negative regulated voltage. The collector of transistor 154 is connected to one terminal of ammeter 160, the other terminal of which is connected through resistor 158 to the negative regulated voltage.

Thus, in operation, transistor 138 acts as a constant current source to limit the current that passes through light emitting diode 104. Transistor 154 amplifies the current that passes through phototransistor 106, so that the reading on meter 160 is indicative of the radiation incident on phototransistor 106 in liquid cell 102.

Figure 8:
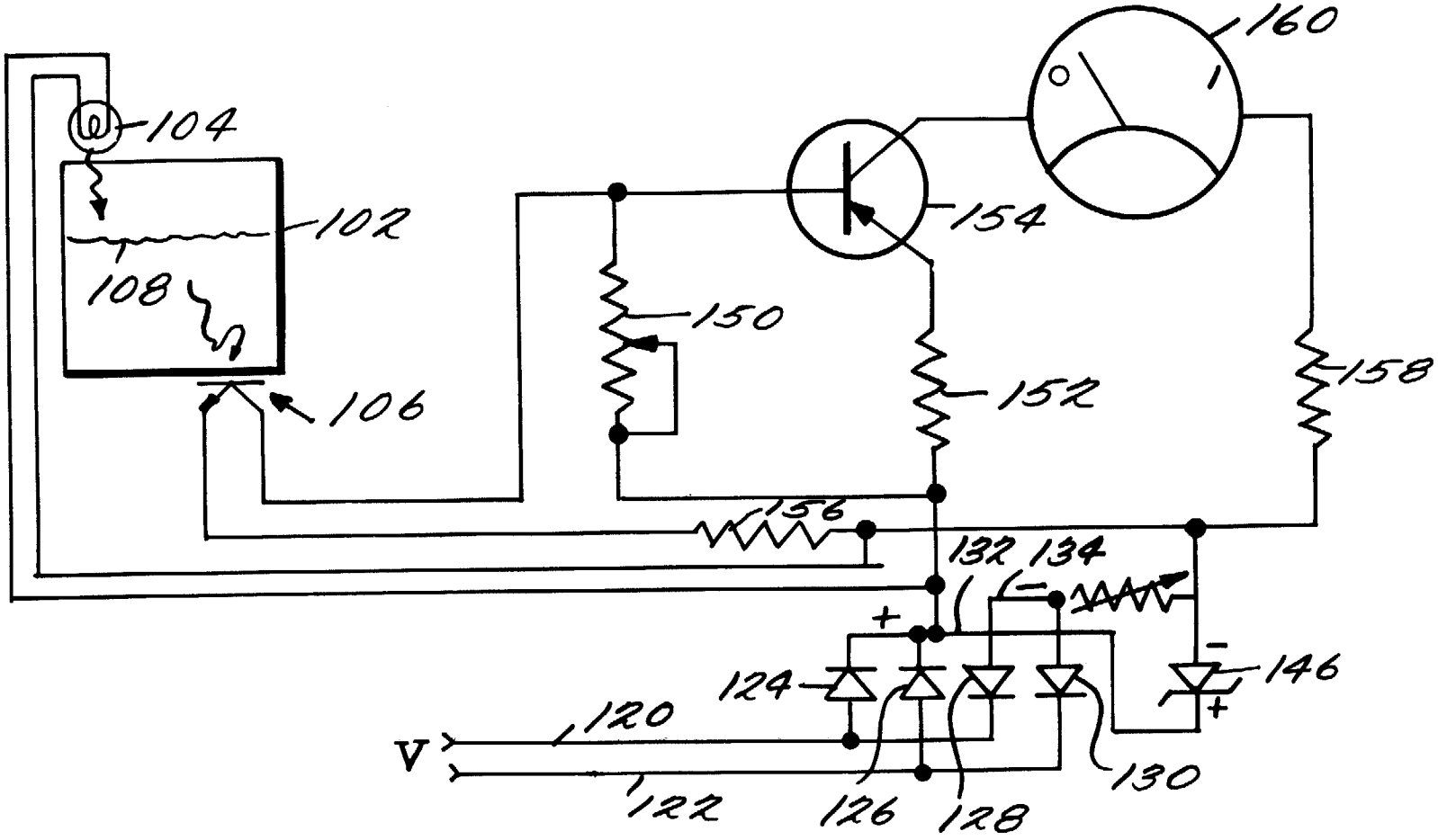
FIG. 8 is a second embodiment of the circuitry of the present invention with an incandescent light source.

FIG. 8 illustrates another embodiment of the circuitry of the present invention wherein source 104 is an incandescent light and detector 106 is a phototransistor. Corresponding parts of FIGS. 7 and 8 have been numbered similarly. A voltage is applied across lines 120 and 122. Diodes 124, 126, 128 and 130 are arranged so that the voltage on line 132 is positive with respect to the voltage on line 134, independent of the polarity of the input voltage on lines 120 and 122. The voltage across lines 132 and 134 is regulated by variable resistor 148 and zener diode 146. The positive regulated voltage is applied to one terminal of source 104, the other terminal of which is connected to the negative regulated voltage. The positive regulated voltage is also applied to the base and emitter of transistor 154 through variable resistor 150 and resistor 152 respectively. The base of transistor 154 is connected to the collector of phototransistor 106, the emitter of which is connected through resistor 156 to the negative regulated voltage. The collector of transistor 154 is connected to one terminal of ammeter 160, the other terminal of which is connected through resistor 158 to the negative regulated voltage.

Thus, in operation, the incandescent light source is connected across the regulated voltage. Transistor 154 amplifies the current passing through phototransistor 106 which current is visually displayed by ammeter 160. The current through phototransistor 106 is proportional to the radiation incident on phototransistor 106 in liquid cell 102. Thus the current flowing through meter 160 is proportional to the radiation incident on phototransistor 106.

The circuitry described above utilizes an ammeter to visually display the current passing through the phototransistor. The use of a meter is advantageous in that it can differentiate between changes in output related to mere movement and changes in output related to actual vibration. An oscilloscope can be substituted for the ammeter by measuring the voltage drop across resistor 158. However, it is difficult to differentiate with an oscilloscope between changes in output caused by movement and changes in output caused by vibration. For certain applications, the use of an oscilloscope is superior to that of a meter—particularly when the frequency of vibration is desired. Other visual displays could also be used, such as, for example, a graph recorder. Alternatively, level sensitive electronic circuits could be automatically actuated by the detector output as will be appreciated.

For the embodiments described herein, particularly the embodiments illustrated in FIGS. 6 and 12, further amplification may be necessary. The preferred high gain circuit is illustrated in FIG. 13, although any suitable amplifier, well known in the art, may be added to or substituted for the circuitry illustrated in FIGS. 7 and 8.

Figure 13:
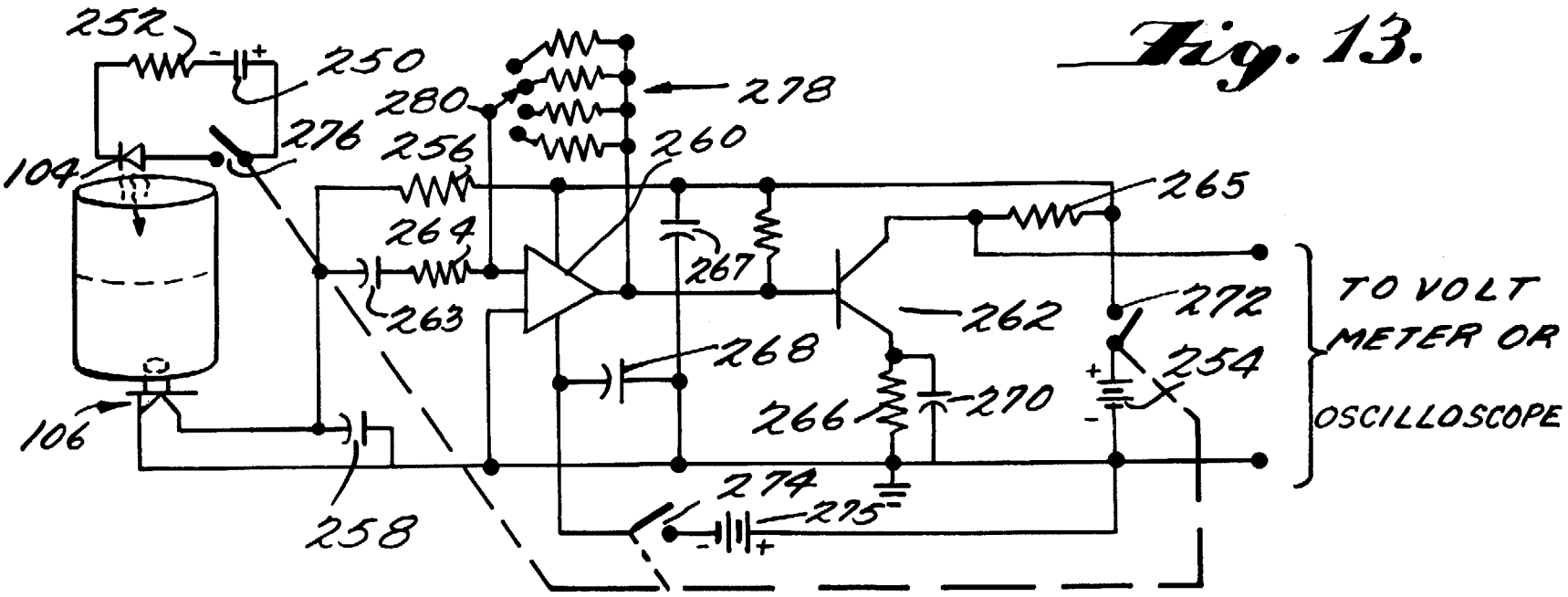
FIG. 13 is a third embodiment of the circuitry of the present invention, capable of detecting more minute vibrations.

As illustrated in FIG. 13, source 104 is powered by voltage source 250 via resistor 252. Voltage source 254 provides positive voltage for the remainder of the circuitry. The positive terminal of source 254 is connected through resistor 256 to the collector of phototransistor 106, the emitter of which is connected to ground. Capacitor 258 provides high frequency filtering. As the intensity of light striking detector 106 varies, the resistance of detector 106, and therefore the voltage across detector 106, varies, which variations are applied to amplifier 260 through AC coupling capacitor 263 and resistor 264. Amplifier 260 may be any amplifier well known in the art, but in the preferred embodiment is the MC 1741 operational amplifier manufactured by Motorola. Resistor network 278 together with switch 280 enable the gain of emplifier 260 to be varied. The output of operational amplifier 260 is applied to the base of transistor 262. Resistors 265 and 266 connect the collector and emitter of transistor 262 to the positive voltage source and ground, respectively. Capacitors 267, 268, and 270 provide filtering for the circuit. Switches 272, 274 and 276 may be in the form of a three circuit single pole switch for simultaneously activating source 104, amplifier 260 and transistor 262. Switch 274 connects negative voltage supply 275 to the appropriate input terminal of amplifier 260 to supply the necessary negative voltage thereto. The output of the illustrated amplification circuit, between the collector of transistor 262 and resistor 265, may be applied to a voltmeter or oscilloscope.

In operation, the vibration of container 102 causes variations in the resistance of phototransistor 106. The AC component of these variations are detected by amplifier 260 through AC coupling capacitor 263 and amplified. The output of amplifier 260 is applied to the base of transistor 263, which transistor further amplifies the signal. The amplified signal may then be applied to a voltmeter or an oscilloscope for visual display.

Variation of the parameters of the detectors illustrated in FIGS. 1–6, as a function of the application, may be desirable. For example, the liquid cell 102 size, viscosity of the liquid used, liquid depth, and the frequency and strength of the vibrations detected all influence the variation in the output of detector 106. By varying the parameters of the detector, particularly the viscosity of the liquid used, the detector can be adapted to detect the entire range of vibrations from those caused by soft footsteps across the room to those caused by the most tremendous earth tremors.

As mentioned above, the present invention, particularly the embodiments illustrated in FIGS. 1–8, finds useful application in the field of seismology. A detector may be mounted on a plate or pole, which is positioned upon a solid foundation in order to amplify earth tremors. The detector mounted on a pole, e.g., made of steel, erves as an amplifier, since a steel pole has less than complete rigidity. The further the detector is mounted from the foundation or plate and the less rigid the pole, the greater the amplification. The occurrence of a tremor causes liquid surface 108 to be disturbed thereby altering the radiation incident on detector 106. It may be advantageous to replace ammeter 160 in FIGS. 7 and 8 with a graph recorder so that the degree of earth tremors may be recorded over time. The embodiments illustrated in FIGS. 5 and 6 may be particularly useful in order to maximize the sensitivity of the detector. It may also be advantageous to mount a number of detectors filled with liquids of varying viscosity on one plate or pole or several plates or poles. In this manner, vibrations of varying intensity and frequency will more adequately and dependably be detected.

The embodiments illustrated in FIGS. 1–8 may also be advantageously employed to detect misalignment in the wheels of a vehicle. One of the characteristics of a wheel out of alignment is that it causes the axle and suspension system to which it is attached to vibrate more than an axle and suspension system attached to a wheel in alignment. Magnet 112 may be used to mount detectors to the same side of the front and rear suspension systems of a vehicle, more particularly, to the respective shock mounts. The output of the detectors may then be compared to determine if either the front or rear tire is producing excessive vibration, indicative of misalignment.

As mentioned above, the use of ammeter 160 is particularly advantageous in that the meter can differentiate between variations caused by movement of the vehicle and variations caused by actual vibrations, since the meter response to vibration is of a clearly higher frequency than the response to motion. However, if the actual frequency of vibration must be determined, an oscilloscope or suitable frequency sensitive circuit is a superior display tool.

The failure of mechanical components of machinery may also be predicted using the embodiments of the present invention illustrated in FIGS. 1–8. A detector is mounted to the mechanical component to be monitored and the vibration level of that particular component is monitored over time. A characteristic of a mechanical component approaching failure is that the level of vibration of that component significantly increases. By monitoring the vibration level over time, it is possible to predict component failure.

It may be particularly useful in this application to replace ammeter 160 in FIG. 7 or 8 with a graph recorder so that the degree of vibration can be compared over time on the graph prepared by the recorder. If the vibration level to be detected is relatively small, the embodiments illustrated in FIGS. 5 and 6 may be particularly useful in order to maximize the sensitivity of the detector.

The metal fatigue in an aircraft support may also be monitored with the apparatus illustrated in FIGS. 1–8. Metal fatigue in aircraft is primarily caused by skin vibration or flexing or a combination thereof. A detector may be mounted on the skin of the aircraft over the support whose metal fatigue is to be monitored. By comparing the output of detector 106 over time, the vibrations causing metal fatigue can be monitored, enabling the prediction of metal failure. It may be advantageous to replace ammeter 160 in FIGS. 7 and 8 with a graph recorder so that the degree of vibration may be recorded over time.

The embodiments illustrated in FIGS. 1–8 may be employed to detect the intrusion of a subject into an area. Housing 100 is mounted on the floor of the area and the liquid within liquid cell 102 is such that even the slightest vibrations caused by a subject walking softly across a floor will be detected. Ammeter 160 in FIGS. 7 or 8 may advantageously be replaced with circuitry which either sounds an alarm or merely records the presence of the subject.

The balance of a vehicle wheel may also be determined with the apparatus illustrated in FIGS. 1–8. Imbalance causes the wheel to vibrate resulting in premature tire wear. Often, neither the static nor dynamic balancing devices commonly used is capable of detecting wheel imbalance, since, in many instances, the wheel will not exhibit symptoms of unbalance (i.e., vibrate) until it is disturbed by an outside force such as a bump or rock. Thus the present invention is ideal as an imbalance detector since it can be utilized while the vehicle is operating. Detection devices as illustrated may be mounted on the suspension systems of two or more vehicle wheels, and the output of the various detectors 106 may be compared in order to determine if any of the wheels are imbalanced.

FIG. 9 illustrates an embodiment of liquid cell 102 suitable for use as a device for leveling an object. As the angle of the axis between source 104 and detector 106 varies with respect to liquid surface 108, the amount of light transmitted through surface 108 varies. This variation is readily visible on ammeter 160 of the circuitry illustrated in FIGS. 7 and 8, which circuitry may be utilized with all of the embodiments described herein.

Source 104 and detector 106 may be positioned in any manner upon container 102, as long as source 104 and detector 106 are on opposite sides of surface 108. The reading on ammeter 160 will vary as the angular relationship between the source 104-detector 106 axis and surface 108 varies. One need only be aware of the meter reading when the object to be leveled achieves the desired pitch.

In the preferred embodiment, as illustrated in FIG. 9, the arrangement of source 104 and detector 106 and the method for mounting liquid cell 102 are such that when the object to be leveled has achieved the desired pitch, the axis of source 104 and detector 106 is perpendicular to surface 108. When the axis is perpendicular, the output of detector 106 is a maximum, since the transmission of light through a media interface is maximum when the light rays are perpendicular to the interface. Thus, in the preferred embodiment, one need only vary the pitch of the object until the reading of meter 160 is maximum. It may be useful to use a magnet to mount housing 100 on the device to be leveled.

The present invention may also advantageously be utilized as an accelerometer. As container 102 is accelerated, the liquid filling container 102 tends to accumulate on the side opposite the direction of acceleration. This changes the angle of surface 108 with respect to the axis between detector 106 and source 104. As discussed above, angle variation alters the amount of light transmitted through surface 108. The circuitry illustrated in FIG. 7 or 8 converts the altered transmission to a readily visible form.

In accelerometer applications, the embodiment of container 102 illustrated in FIG. 10 has been found particularly advantageous. Source 104 and detector 106 are positioned on opposite surfaces of container 102 so that a substantial portion of each of the source 104 and detector 106 cross-sections are both above and below surface 108 when container 102 is at rest. While container 102 is at rest, radiation from source 104 enters detector 106 both above and below surface 108. As container 102 accelerates, source 104 and detector 106 each become more entirely on opposite sides of liquid surface 108. As a result of Braggs condition and the angles involved, radiation from source 104 will be reflected from and not transmitted through surface 108. Therefore, as source 104 becomes more completely on the side of surface 108 opposite of detector 106, the output of detector 106 decreases. This decrease can be converted to a useful form with the circuitry of FIG. 7 or 8. It is preferable that the cross-sections of source 104 and detector 106 are large enough so that when container 102 is at maximum acceleration, source 104 and detector 106 are just on opposite sides of surface 108. Meter 160 may advantageously be replaced with circuitry interfacing the circuitry of FIG. 7 or 8 with any apparatus requiring an accelerometer input.

Obviously, the axis of source 104 and detector 106 must lie in the same direction as the direction of acceleration. The embodiment of FIG. 9 may also be utilized as and acceleration detector, while the embodiment of FIG. 10 may be utilized as a leveling device.

The present invention, in the embodiment illustrated in FIG. 10 may be employed as an accelerometer for a two dimensional inertial navigation position locator. Two containers 102 are mounted on a gyroscopic stabilization platform (which directionally stabilizes the containers) so that the axis of source 104 and detector 106 in one container 102 is transverse to the same axis in the other container. As illustrated schematically in FIG. 11, the output signals of detectors 106 (which are proportional to the acceleration along the respective source-detector axes) are amplified by circuitry 200, which may be the circuitry illustrated in FIG. 7 or 8, and supplied to integration means 204 and 206, which produce velocity data from the signals representing acceleration. Integration means 208 and 210 convert the velocity data to positional data. It is also necessary to include a direction indicator in the system, since it is impossible to tell from the output of detectors 106 whether the acceleration has a positive or negative value.

Circuitry may be added in order to overcome errors inherent with an inertial navigation system. Any of the methods of correction well known in the art (e.g., the Schuler pendulum) could be used.

The circuitry necessary to process the output of detectors 106 is most simple when the source-detector axes in the two containers are perpendicular. The output of the integrators then produce data with respect to a Cartesian coordinate system (i.e., position with respect to perpendicular axes). If the source-detector axes are not perpendicular, further computation is necessary in order to convert the output of detectors 106 so that positional data with respect to a Cartesian coordinate system is obtained.

Since at rest, surface 108 can only be horizontal, the inertial navigation system described above is useful for determining either position in a horizontal plane, or the projection of position onto a horizontal plane. A more conventional type of acceleraometer would be necessary to produce vertical accelerational data.

The accelerometer embodiment of the present invention, as illustrated in FIG. 10, may also be utilized to detect misalignment of the wheels of a vehicle or steering malfunctions in the vehicle. A characteristic of certain types of misalignment problems or steering malfunctions is that the vehicle tends to accelerate in a direction transverse to the direction desired by the operator. Container 102, as embodied in FIG. 10, may be utilized to detect acceleration in a direction transverse to the desired direction of motion by positioning the axis of source 104 and detector 106 parallel to the roadway and perpendicular to the longitudinal axis of the vehicle. Container 102 is advantageously mounted on the suspension system of the vehicle, and more particularly the shock mounts.

It may be useful to mount two containers, one on the front suspension system and one on the rear suspension system, so that the acceleration of the front and rear of the vehicle transverse to the desired path may be compared. Two circuits as illustrated in FIG. 7 or 8, one for each container 102, are needed, and it is preferable that the two meters 160 be set side by side in order to directly compare the transverse acceleration values. Meters 160 may advantageously be replaced with either an oscilloscope or a graph recorder in order to more clearly display the differences in acceleration. Magnet 112 may be used to affix container 102 to the vehicle.

Although a number of exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined by the following claims.

What is claimed is:

1. An electro-mechanical transducer comprising:

a container;

a liquid partially filling said container thereby defining a liquid surface therewithin, *at least a portion of said surface having a substantially constant slope when said container is quiescent*;

a source of electromagnetic radiation mounted with respect to said container so as to illuminate at least a portion of the interior thereof;

an electromagnetic radiation detection means responsive to said source, mounted with respect to said container so as to detect radiation after interaction with said liquid surface within said container, movement of said container causing the output of said detection means to vary as a result of the changing transmissive and refractive properties of said liquid surface; and means for directing the radiation from said source so that substantially all of the radiation passes at least once through said liquid surface before impinging on said detection means *and a line connecting said source and detection means passes through said liquid surface constant slope portion*.

2. Apparatus as in claim 1 wherein said source is an incandescent light bulb.

3. Apparatus as in claim 1 wherein said source is a light emitting diode.

4. Apparatus as in claim 1 wherein said source is an infrared radiation source.

5. Apparatus as in any of claims 1–4 wherein said liquid is water.

6. Apparatus as in any of claims 1–4 wherein said liquid is alcohol.

7. Apparatus as in any of claims 1–4 wherein said liquid is oil.

8. Apparatus as in any of claims 1–4 wherein said detection means is a photoelectric cell.

9. Apparatus as in any of claims 1–4 wherein said detection means is a photoresistive cell.

10. Apparatus as in any of claims 1–4 wherein said detection means is a phototransistor.

11. Apparatus as in claim 1 wherein:

said container is opaque to electromagnetic radiation of a particular frequency range;

said source produces radiation at least partially within said frequency range; and said detection means is responsive to radiation at least partially within said frequency range.

12. Apparatus as in claim 1 further comprising at least one of a first set of fiber optics directing radiation from said source to a plurality of locations within said container, and a second set of fiber optics directing radiation from a plurality of locations within said container to said detection means so that said output variation represents the average change in the transmissive and refractive properties of said surface.

13. Apparatus as in claim 1 wherein the area of said liquid surface illuminated by said source is at least mostly out of the area of said liquid surface viewed by said detection means so that as said container vibrates, said surface becomes more uneven, thereby refracting more of the radiation from said source into said detection means.

14. Apparatus as in claim 1 wherein:

said source and detection means are substantially entirely on opposite sides of said liquid surface;

the angle of incidence of the light from said source with said liquid surface is not greater than 45°; and the light incident on the area of the wall of said container opposite said source and on the opposite side of said liquid surface from said source is at least mostly not incident on said detection means when said liquid surface is substantially quiescent, so that as said container vibrates, said surface becomes more uneven thereby refracting more of the radiation from said source into said detection means.

15. Apparatus as in claim 1 wherein said source and said detection means are substantially entirely disposed on opposite sides of said liquid surface.

16. A vibration detector system comprising:

a container;

a source of electromagnetic radiation mounted in said container so as to illuminate at least a portion of the interior thereof;

a liquid partially filling said container thereby defining a liquid surface therewithin, said liquid being at least partially transparent to said radiation;

electromagnetic radiation detection means responsive to said source, mounted on said container so as to detect radiation after interaction with said liquid surface within said container, for producing a signal proportional to the radiation incident on said detection means;

means for directing the radiation from said source so that substantially all of the radiation passes at least once through said liquid surface before impinging on said detection means; and means responsive to said detection means for processing said signal into a more useful form of data so that as said detection means vibrates, the light transmissive properties of the surface of said liquid are altered, causing said signal and said data to be correspondingly altered.

17. Apparatus as in claim 16 wherein said processing means comprises:

amplifying means for amplifying said detection means signal; and means for displaying the amplified signal in a visually meaningful form.

18. Apparatus as in claim 17 wherein said displaying means comprises at least one of an ammeter and a voltmeter.

19. Apparatus as in claim 17 wherein said displaying means comprises an oscilloscope.

20. Apparatus as in claim 16 wherein:

said container is opaque to electromagnetic radiation of a particular frequency range;

said source produces radiation at least partially within said frequency range; and said detection means is responsive to radiation within said frequency range.

21. Apparatus as in claim 16 wherein:

said source and said detection means are both mounted on the same side of said liquid surface;

said means for directing comprises mirror means mounted to said container on the side of said liquid surface opposite said source and said detection means for reflecting radiation from said source to said detection means; and the aperture angle of said source and the detection angle of said detection means are limited so that substantially all of the radiation detected by said detection means has passed at least once through said surface.

22. Apparatus as in claim 16 wherein said source and said detection means are mounted on opposite sides of said liquid surface.

23. Apparatus as in claim 22 wherein:

said container is cylindrical; and said source and said detection means are mounted on opposite ends of said cylindrical container and at substantially diametrically opposed respective positions on said opposite ends.

24. Apparatus as in claim 22 wherein the area of said liquid surface illuminated by said source is substantially offset from the area of said liquid surface viewed by said detection means so that as said container vibrates, said surface becomes more turbulent, thereby refracting more of the radiation from said source into said detection means.

25. Apparatus as in claim 16 further comprising at least one of a first set of fiber optics directing radiation from said source to a plurality of locations within said container, and a second set of fiber optics directing radiation from a plurality of locations within said container to said detection means so that said output variation represents the average change in the transmissive and refractive properties of said surface.

26. Apparatus as in claim 16 wherein:

said source and detection means are on opposite sides of said liquid surface;

the angle of incidence of the light from said source with said liquid surface is not greater than 45°; and the light incident on the area of the wall of said container opposite said source and on the opposite side of said liquid surface from said source is at least mostly not incident on said detection means when said liquid surface is substantially quiescent, so that as said container vibrates, said surface becomes more uneven thereby refracting more of the radiation from said source into said detection means.

27. An electro-mechanical device for leveling an object comprising:

a container;

a liquid partially filling said container thereby defining a liquid surface therewithin, *at least a portion of said surface having a substantially constant slope when said container is quiescent;* a source of electromagnetic radiation mounted in said container so as to illuminate at least a portion of the interior thereof;

electromagnetic radiation detection means responsive to said source, mounted in said container so as to detect radiation after interaction with said liquid surface within said container, for producing a signal related to the radiation incident on said detection means;

means responsive to said detection means for processing said signal to provide an output corresponding to the orientation of said container; and means for mounting said container so that said source is entirely on one side of the liquid surface of said liquid while said detection means is entirely on the other side of said surface *and a line connecting said source and detection means passes through said liquid surface constant slope portion.*

28. Apparatus as in claim 27 wherein said processing means comprises:

amplifying means for amplifying said detection means signal; and means for displaying the amplified signal in a visually meaningful form.

29. Apparatus as in claim 28 wherein said displaying means is at least one of an ammeter and a voltmeter.

30. Apparatus as in claim 27 wherein:

said container is opaque to electromagnetic radiation of a particular frequency range;

said source produces radiation at least partially within said frequency range; and said detection means is responsive to radiation within said frequency range.

31. Apparatus as in claim 27 wherein said means for mounting positions the axis between said source and said detection means vertically when said object is positioned at the desired angular orientation thereby resulting in a maximum signal from said detection means.

32. An electro-mechanical accelerometer comprising:

a container;

a liquid partially filling said container thereby defining a liquid surface therewithin, *at least a portion of said surface having a substantially constant slope when said container is quiescent;* a source of electromagnetic radiation mounted in said container so as to illuminate at least a portion of the interior thereof;

electromagnetic radiation detection means responsive to said source, mounted in said container so as to detect radiation after interaction with said liquid surface within said container, for producing a signal related to the radiation incident on said detection means;

means for mounting said container so that the axes of said source and said detection means are both vertical [and], lie along the same line, *and pass through said liquid surface constant slope portion*; and means connected to said detection means for processing said signal to provide an accurate indication of acceleration.

33. Apparatus as in claim 32 wherein:

said container is opaque to electromagnetic radiation of a particular frequency range;

said source produces radiation at least partially within said frequency range; and said detection means is responsive to radiation within said frequency range.

34. Apparatus as in claim 32 wherein said processing means comprises:

amplifying means for amplifying said detection means signal; and means for displaying the amplified signal in a visually meaningful form.

35. Apparatus as in claim 34 wherein said displaying means is at least one of an ammeter and a voltmeter.

36. A seismograph comprising:

at least one of a plate and pole positioned upon a solid foundation for amplifying earth tremors;

a container rigidly mounted on said at least one of a plate and pole;

a liquid partially filling said container thereby defining a liquid surface therewithin;

a source of electromagnetic radiation mounted with respect to said container so as to illuminate at least a portion of the interior thereof;

an electromagnetic radiation detection means responsive to said source, mounted with respect to said container so as to detect substantially only the radiation having passed at least once through said liquid surface within said container, for producing a signal related to the radiation incident on said detection means; and means responsive to said detection means for processing said signal to represent a detected earth tremor.

37. Apparatus as in claim 36 wherein:

said container is opaque to electromagnetic radiation of a particular frequency range;

said source produces radiation at least partially within said frequency range; and said detection means is responsive to radiation within said frequency range.

38. Apparatus as in claim 36 wherein said processing means comprises:

amplifying means for amplifying said detection means signal; and means for displaying the amplified signal in a visually meaningful form.

39. Apparatus as in claim 38 wherein said means for displaying comprises a graph recorder which records said amplified current over time.

40. Apparatus as in claim 36 wherein:

said source and said detection means are both mounted on the said side of said liquid surface;

said apparatus further comprises mirror means mounted with respect to said container on the side of said liquid surface opposite said source and said detection means for reflecting radiation from said source to said detection means; and the aperture angle of said source and the detection angle of said detection means are limited so that substantially all of the radiation detected by said detection means has passed at least once through said surface.

41. Apparatus as in claim 36 further comprising means for mounting said container so that said source and said detection means are on opposite sides of said liquid surface.

42. Apparatus as in claim 41 wherein:
said container is cylindrical; and
said source and said detection means are mounted on opposite ends of said cylindrical container and at substantially diametrically opposed positions on said ends.

43. Apparatus as in claim 41 wherein the area of said liquid surface illuminated by said source is substantially offset from the area of said liquid surface viewed by said detection means so that as said container vibrates, said liquid surface becomes more turbulent, thereby refracting more of the radiation from said source into said detection means.

44. Apparatus as in claim 36 further comprising at least one of a first set of fiber optics directing radiation from said source to a plurality of locations within said container, and a second set of fiber optics directing radiation from a plurality of locations within said container to said detection means so that said output variation represents the average change in the transmissive and refractive properties of said liquid surface.

45. Apparatus as in claim 36 wherein:
said source and detection means are on opposite sides of said liquid surface;
the angle of incidence of the light from said source with said liquid surface is not greater than 45°; and
the light incident on the area of the wall of said container opposite said source and on the opposite side of said liquid surface from said source is at least mostly not incident on said detection means when said liquid surface is substantially quiescent, so that as said container vibrates, said surface becomes more uneven thereby refracting more of the radiation from said source into said detection means.

46. A vibration detector system comprising:
a container;
a source of electromagnetic radiation mounted on said container so as to illuminate at least a portion of the interior thereof;
a liquid partially filling said container thereby defining a liquid surface therewithin, said liquid being at least partially transparent to said radiation in the quiescent state;
electromagnetic radiation detection means responsive to said source, mounted on said container so as to detect radiation after interaction with said liquid surface within said container, for producing a signal related to the radiation incident on said detection means;
means for mounting said container so that said source and said detection means are entirely disposed on opposite sides of said liquid surface;
the area of said liquid surface illuminated by said source being substantially offset from the area of said liquid surface viewed by said detection means; and
means responsive to said detection means for processing said signal to indicate the vibration of said container.

47. Apparatus as in claim 46 wherein said processing means comprises:
amplifying means for amplifying said detection means signal; and
means for displaying the amplified signal in a visually meaningful form.

48. Apparatus as in claim 47 wherein said displaying means comprises at least one of an ammeter and a voltmeter.

49. Apparatus as in claim 47 wherein said displaying means comprises an oscilloscope.

50. Apparatus as in claim 46 wherein;
said container is opaque to electromagnetic radiation of a particular frequency range;
said source produces radiation at least partially within said frequency range; and
said detection means is responsive to radiation within said frequency range.

51. Apparatus as in claim 46 wherein:
said container is cylindrical; and
said source and said detection means are mounted on opposite ends of said cylindrical container.

52. A method of transforming mechanical movement of an object to an electrical signal comprising the steps of:
mounting a container partially filled with a liquid on said object thereby defining a liquid surface therewithin, *at least a portion of said surface having a substantially constant slope when said container is quiescent*;
directing a source of electromagnetic radiation into said container; and
photo-electrically detecting *with detection means* variations in the intensity of substantially only the radiation having passed at least once through said liquid surface, incident after interaction with said liquid surface on an area in said container with detection means, *a line connecting said source and detection means passing through said liquid surface constant slope portion*, said variations being caused by changes in the transmissive and refractive properties of the surface of said liquid induced by movement of said container.

53. A method as in claim 52 wherein the area of said liquid surface illuminated by said source is substantially offset from the area of said liquid surface viewed by said detection means so that as said container vibrates, said surface becomes more turbulent, thereby refracting more of the radiation from said source into said detecting means.

54. A method as in claim 52 wherein:
said source and detection means are on opposite sides of said liquid surface;
the angle of incidence of the light from said source with said liquid surface is not greater than 45°; and
the light incident on the area of the wall of said container opposite said source and on the opposite side of said liquid surface from said source is at least mostly not incident on said detection means when said liquid surface is substantially quiescent, so that as said container vibrates, said surface becomes more uneven thereby refracting more of the radiation from said source into said detection means.

55. A method as in claim 52, further comprising at least one of the steps of directing radiation from said source to a plurality of locations within said container with a first set of fiber optics, and directing radiation from a plurality of locations within said container to said detection means with a second set of fiber optics so that said output variations represents the average change in the transmissive and refractive properties of said surface.

56. A method of detecting vibrations in an object comprising the steps of:

mounting a container partially filled with a liquid on said object thereby defining a liquid surface therewithin;

directing a source of electromagnetic radiation into said container and through said liquid surface;

detecting variations in the intensity of substantially only the radiation, having passed at least once through said liquid surface, incident on an area in said container with detection means, said variations being caused by changes in the transmissive and refractive properties of said liquid surface upon vibration of said container; and electrically processing the detected variations to indicate detected vibration of said object.

57. A method as in claim 56 wherein:

said directing step and said detecting steps are performed on the same side of said liquid surface and said directing step comprises the steps of reflecting said radiation on the other side of said liquid surface toward the site of said detecting step.

58. A method as in claim 56 wherein said directing step and said detecting step occurs on opposite sides of said liquid surface.

59. A method as in claim 58 wherein the area of said liquid surface illuminated by said source is substantially offset from the area of said liquid surface viewed by said detection means so that as said container vibrates, said surface become more turbulent, thereby refracting more of the radiation from said source into said detection means.

60. A method as in claim 56 wherein:

said source and detection means are on opposite sides of said liquid surface;

the angle of incidence of the light from said source with said liquid surface is not greater than 45°; and the light incidence on the area of the wall of said container opposite said source and on the opposite side of said liquid surface from said source is at least mostly not incident on said detection means when said liquid surface is substantially quiescent, so that as said container vibrates, said surface becomes more uneven thereby refracting more of the radiation from said source into said detection means.

61. A method as in claim 56 further comprising the steps of:

directing radiation from said source to a plurality of locations within said container with a first set of fiber optics; and directing radiation from a plurality of locations within said container to said detection means with a second set of fiber optics so that said output variation represents the average changes in the transmissive and refractive properties of said surface.

62. A method of detecting vibrations in an object comprising entirely the steps of:

mounting a container partially filled with a liquid on said object thereby defining a liquid surface therewithin;

directing a source of electromagnetic radiation into said container and through said liquid surface;

detecting variations in the intensity of radiation after passage through said liquid surface;

said directing and detecting steps occurring on opposite sides of said liquid surface and the area of said liquid surface illuminated by said source being substantially offset from the area of said liquid surface viewed during said detecting step so that as said container vibrates, said surface becomes more turbulent thereby refracting more of the radiation from said source into said detection means; and processing the detected variations to represent the detected vibration of said object.

63. A method of angularly adjusting the position of an object comprising the steps of:

mounting a container partially filled with a liquid on said object thereby defining a fluid surface therewithin, *at least a portion of said surface having a substantially constant slope when said container is quiescent*;

directing a source of electromagnetic radiation into said container *entirely* from one side of said liquid surface;

detecting *with detection means* variations in the intensity of incident radiation at a location entirely on the other side of said liquid surface, *a line connecting said source and detection means passing through said liquid surface constant slope portion*;

processing the detected variations to represent a predetermined characteristic signal when said object is positioned at a corresponding predetermined angular orientation; and moving said object until said signal achieves said predetermined characteristic.

64. A method as in claim 63 wherein said detecting step senses a maximum intensity of radiation when said object is positioned at the desired angular orientation.

65. A method of measuring the acceleration of an object comprising the steps of:

mounting a container partially filled with a liquid on said object defining a liquid surface therewithin, *at least a portion of said surface having a substantially constant slope when said container is quiescent*;

directing a source of electromagnetic radiation into said container; and detecting *with detection means* variations in the intensity of substantially only the radiation, having passed at least once through said liquid surface, *a line connecting said source and detection means passing through said liquid surface constant slope portion, said variations* caused by changes in the refractive and transmissive properties of said liquid surface as a result of the variations in the acceleration-influenced angle of said liquid surface.

66. A method as in claim 65 wherein said detecting step detects radiation along a vertical axis so that as said container accelerates, the change in the angular relationship of the surface of said liquid to the vertical produces said variations.

67. A method of measuring earth tremors comprising the steps of:

positioning at least one of a plate and pole upon a solid foundation in order to amplify said tremors;

rigidly mounting a container partially filled with a liquid on said at least one of a plate or pole thereby defining a liquid surface therewithin;

directing a source of electromagnetic radiation into said container and through said liquid surface; and detecting variations in the intensity of substantially only the radiation having passed at least once through said liquid surface, said variations being caused by changes in the transmissive and refractive properties of said liquid surface upon vibration of said container resulting from earth tremors.

68. A method as in claim 67 wherein:

said directing step and said detecting step are performed on the same side of said liquid surface; and said directing step comprises the steps of reflecting said radiation on the other side of said liquid surface toward the site of said detecting step.

69. A method as in claim 67 wherein said directing step and said detecting step occur on opposite sides of said liquid surface.

70. A method as in claim 69 wherein the area of said liquid surface illuminated by said source is substantially offset from the area of said liquid surface viewed during said detecting step so that as said container vibrates, said surface becomes more turbulent thereby refracting more of the radiation from said source into the view of said detecting step.

71. Method as in claim 67 wherein:

said source and detection means are on opposite sides of said liquid surface;

the angle of incidence of the light from said source with said liquid surface is not greater than 45°; and the light incident on the area of the wall of said container opposite said source and on the opposite side of said liquid surface from said source is at least mostly not incident on said detection means when said liquid surface is substantially quiescent, so that as said container vibrates, said surface becomes more uneven thereby refracting more of the radiation from said source into said detection means.

72. A method as in claim 67 further comprising at least one of the steps of directing radiation from said source to a plurality of locations within said container with a first set of fiber optics, and directing radiation from a plurality of locations within said container to said detecting step with a second set of fiber optics so that said detected variation represents the average change in the transmissive and refractive properties of said liquid surface.

73. A method of detecting misalignment of the wheels of a vehicle comprising the steps of:

mounting a container partially filled with liquid thereby defining corresponding fluid levels therewithin one side of each of the front and rear suspension systems of said vehicle;

directing a source of electromagnetic radiation into each of said containers;

detecting variations in the intensity of substantially only the radiation, having passed at least once through said liquid surface, in each of said containers caused by vibrations and/or by accelerations transverse to the axis of said vehicle and resulting from said misalignment; and comparing said detected variations in said containers on said front and rear suspension systems of said vehicle to detect a misaligned vehicle wheel.

74. A method as in claim 73 wherein said mounting step comprises the steps of affixing a magnet to said containers and attaching said containers to said front and rear suspension systems using said magnet.

75. A method as in claim 73 wherein said comparing step comprises the steps of displaying each of said detected variations in a visually meaningful form.

76. A method as in claim 75 wherein said displaying steps comprise the steps of applying electrical signals representing each of said detected variations respectively to at least one of adjacent ammeters and adjacent voltmeters.

77. A method as in claim 73 wherein said directing and detecting steps in each of said containers are performed on the same side of said liquid surface and said directing step in each of said containers comprises the step of reflecting said radiation from the other side of said liquid surface toward the site of said detecting step.

78. A method as in claim 73 wherein each of said directing and detecting steps occur on opposite sides of said liquid surface.

79. A method as in claim 78 wherein the area of said liquid surface illuminated by said source is substantially offset from the area of said liquid surface viewed during said detecting step so that as said container vibrates, said liquid surface becomes more turbulent, thereby refracting more of the radiation from said source into view of said detecting step.

80. A method as in claim 73 wherein:

said source and detection means are on opposite sides of said liquid surface;

the angle of incidence of the light from said source with said liquid surface is not greater than 45°; and the light incident on the area of the wall of said container opposite said source and on the opposite side of said liquid surface from said source is at least mostly not incident on said detection means when said liquid surface is substantially quiescent, so that as said container vibrates, said surface becomes more uneven thereby refracting more of the radiation from said source into said detection means.

81. A method as in claim 73 further comprising at least on the steps of directing radiation from said source to a plurality of locations within said container with a first set of fiber optics, and directing radiation from a plurality of locations within said container towards the site of said detecting step with a second set of fiber optics so that said detected variation represents the average change in the transmissive and refractive properties of said liquid surface.

82. A method of identifying steering malfunctions in a vehicle comprising the steps of:

mounting a container partially filled with a liquid thereby defining a liquid surface therewithin on each of the front and rear suspension systems of said vehicle;

directing a source of electromagnetic radiation into each of said containers;

detecting variations in the intensity of radiation in each of said containers along a vertical axis, said variations being caused by changes in the refractive and transmissive properties of said liquid as a result of variations in the acceleration-influenced angle of said liquid surface; and comparing said detected variations in said containers on the front and rear suspension systems of said vehicle to determine whether the front of said vehicle is accelerating in a direction transverse to the axis of said vehicle at a value different from the rear of said vehicle.

83. A method as in claim 82 wherein said mounting step comprises the steps of affixing a magnet to said containers and attaching said containers to said front and rear suspension systems using said magnet.

84. A method as in claim 82 wherein said comparing step comprises the steps of displaying each of said detected variations in a visually meaningful form.

85. A method of predicting failure of mechanical components of machinery comprising the steps of:

mounting a container partially filled with a liquid thereby defining a liquid surface therewithin on said component;

directing a source of electromagnetic radiation into said container and through said liquid surface;

detecting variations in the intensity of substantially only the radiation having passed at least once through said liquid surface being caused by changes in the transmissive and refractive properties of said liquid surface upon vibration of said container; and comparing the detected variations over time in order to monitor the vibration level indicative of imminent component failure.

86. A method of monitoring metal fatigue in an aircraft support comprising the steps of:

mounting a container partially filled with a liquid thereby defining a liquid surface therewithin on the skin of said aircraft near said support;

directing a source of electromagnetic radiation into said container and through said liquid surface;

detecting variations in the intensity of substantially only the radiation having passed at least once through said liquid surface, being caused by changes in the transmissive and refractive properties of said liquid surface upon vibration of said container; and comparing the detected variations over time to monitor the vibration level of said support and detect an increase in the vibration level indicative of metal fatigue.

87. A method of detecting the intrusion of a subject into a building area comprising the steps of:

mounting a container partially filled with liquid thereby defining a liquid surface therewithin on a structural member of said building area;

directing a source of electromagnetic radiation into said container and through said liquid surface;

detecting variations in the intensity of substantially only the radiation having passed at least once through said liquid surface being caused by changes in the transmissive and refractive properties of said liquid surface upon vibration of said container; and comparing the detected variations over time to monitor the vibration level of said floor and to detect an increase in the vibration level indicative of the presence of said subject.

88. A method of detecting imbalance in the wheels of a vehicle comprising the steps of:

mounting a container partially filled with liquid thereby defining corresponding liquid surfaces therewithin on a plurality of suspension systems respectively associated with each of said wheels of said wheels of said vehicle;

directing source of electromagnetic radiation into each of said containers;

detecting variations in the intensity of substantially only the radiation having passed at least once through respective said liquid surfaces in each of said containers being caused by vibrations in said plurality of suspension systems resulting from said imbalance; and comparing said detected variations from said containers on said plurality of suspension systems in order to determine the imbalanced wheel.

89. An electro-mechanical transducer comprising:

a container;

a liquid partially filling said container thereby defining a liquid surface therewithin;

a source of electro-magnetic radiation mounted with respect to said container so as to illuminate at least a portion of said liquid surface;

an electro-magnetic radiation detection means responsive to said source and disposed on the side of said liquid surface opposite said source, the area of said liquid surface illuminated by said source being at least mostly out of the area of said liquid surface viewed by said detection means so that as said container moves, said surface changes orientation, thereby refracting more of the radiation from said source into said detection means.

90. An electro-mechanical transducer comprising:

a container;

a liquid partially filling said container thereby defining a liquid surface therewithin;

a source of electro-magnetic radiation disposed entirely on one side of said surface, the angle of incidence of light from said source with said liquid surface being not greater than 45°;

an electro-magnetic radiation detection means responsive to said source, said detection means being disposed entirely on the other side of said liquid surface, the light incident on the area of wall of said container opposite said source and on the opposite side of said liquid surface from said source being at least mostly not incident on said detection means when said liquid surface is substantially quiescent, so that as said container moves, the said surface changes orientation thereby refracting more of the radiation from said source into said detection means.

91. A method of transforming mechanical movement of an object to an electrical signal comprising the steps of:

mounting a container partially filled with a liquid on said object thereby defining a liquid surface therewithin;

directing a source of electro-magnetic radiation into said container, said source being positioned on one side of said liquid surface;

detecting variations in the intensity of radiation with detection means, said detection means being disposed on the opposite side of said liquid surface;

the angle of incidence of the light from said source with said liquid surface being not greater than 45°; and said detection means being disposed in said container so that the light incident on the area of the wall of said container opposite said source and on opposite side of said liquid surface from said source is at least mostly not incident on said detection means when said liquid level is substantially quiescent, so that as said container moves, said surface changes orientation thereby refracting more of the radiation from said source into said detection means.

* * * * *